United States Patent [19]

Schmuck

[11] Patent Number: 4,509,474
[45] Date of Patent: Apr. 9, 1985

[54] PISTON MACHINE

[76] Inventor: Johann Schmuck, Sternplattenweg 11, 8201 Bad Feilnbach, Fed. Rep. of Germany

[21] Appl. No.: 345,831

[22] Filed: Feb. 4, 1982

[30] Foreign Application Priority Data

Mar. 13, 1981 [DE] Fed. Rep. of Germany ....... 3109778
Aug. 18, 1981 [DE] Fed. Rep. of Germany ....... 3132502

[51] Int. Cl.³ .............................................. F16F 15/24
[52] U.S. Cl. .............................. 123/192 B; 123/198 C; 417/364
[58] Field of Search ................... 123/2, 192 B, 192 R, 123/198 C, DIG. 6, DIG. 7; 74/573 R, 574, 603, 604; 60/716, 718, 626; 417/364; 62/323.1

[56] References Cited

U.S. PATENT DOCUMENTS

| 963,788 | 7/1910 | Merrill | 417/364 |
| 2,736,488 | 2/1956 | Dros | 417/364 |
| 3,402,707 | 9/1968 | Heron | 123/192 B |
| 3,537,437 | 11/1970 | Paul et al. | 123/192 R |
| 3,710,774 | 1/1973 | Weseloh et al. | 123/192 B |
| 4,308,001 | 12/1981 | Hofbauer et al. | 417/364 |
| 4,372,257 | 2/1983 | Hofbauer et al. | 417/364 |

FOREIGN PATENT DOCUMENTS

| 614347 | 6/1935 | Fed. Rep. of Germany . |
| 975104 | 8/1961 | Fed. Rep. of Germany . |
| 3027568 | 2/1981 | Fed. Rep. of Germany . |
| 26038 | of 1911 | United Kingdom . |

Primary Examiner—Ira S. Lazarus
Assistant Examiner—R. S. Bailey
Attorney, Agent, or Firm—Flynn, Thiel, Boutell & Tanis

[57] ABSTRACT

A machine has two cylinders with respective pistons slidably supported therein, and has two crankshafts carrying counterweights operatively coupled to the respective pistons. A balance shaft carrying a balance weight is associated with and extends parallel to each crankshaft. The cylinders, crankshafts and balance shafts are parallel to and arranged in mirror-image fashion on opposite sides of a plane of symmetry. The crankshafts rotate synchronously in opposite directions, and each balance shaft rotates in an opposite direction from and at twice the speed of the associated crankshaft. In one embodiment the machine is an internal combustion engine and fuel is supplied to the cylinders through an eddy chamber which communicates with both cylinders through respective ducts. Two machines of the above type, an internal combustion engine and a compressor, can be operationally coupled, each crankshaft and balance shaft of the engine directly driving a respective crankshaft or balance shaft of the compressor.

21 Claims, 9 Drawing Figures

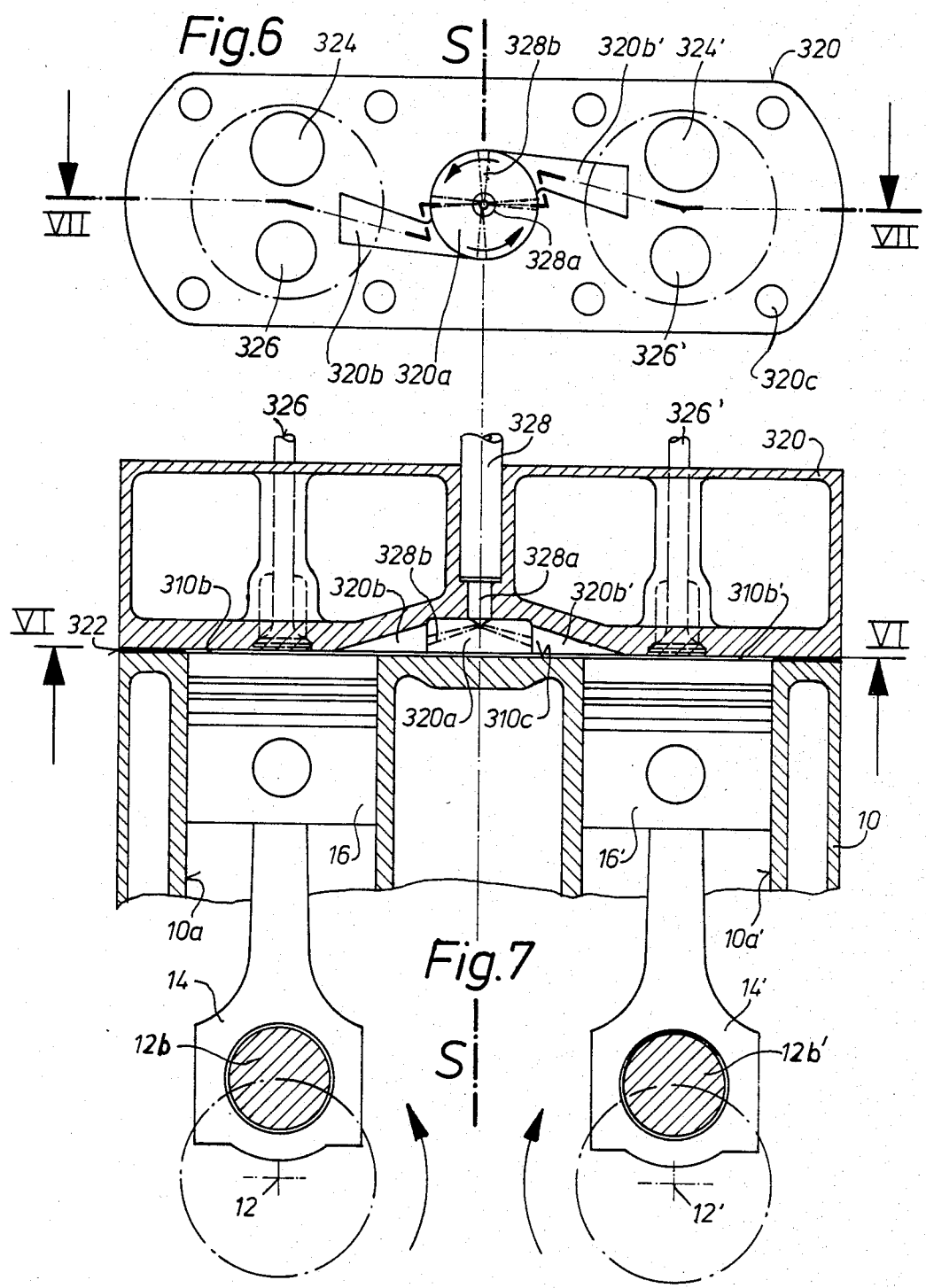

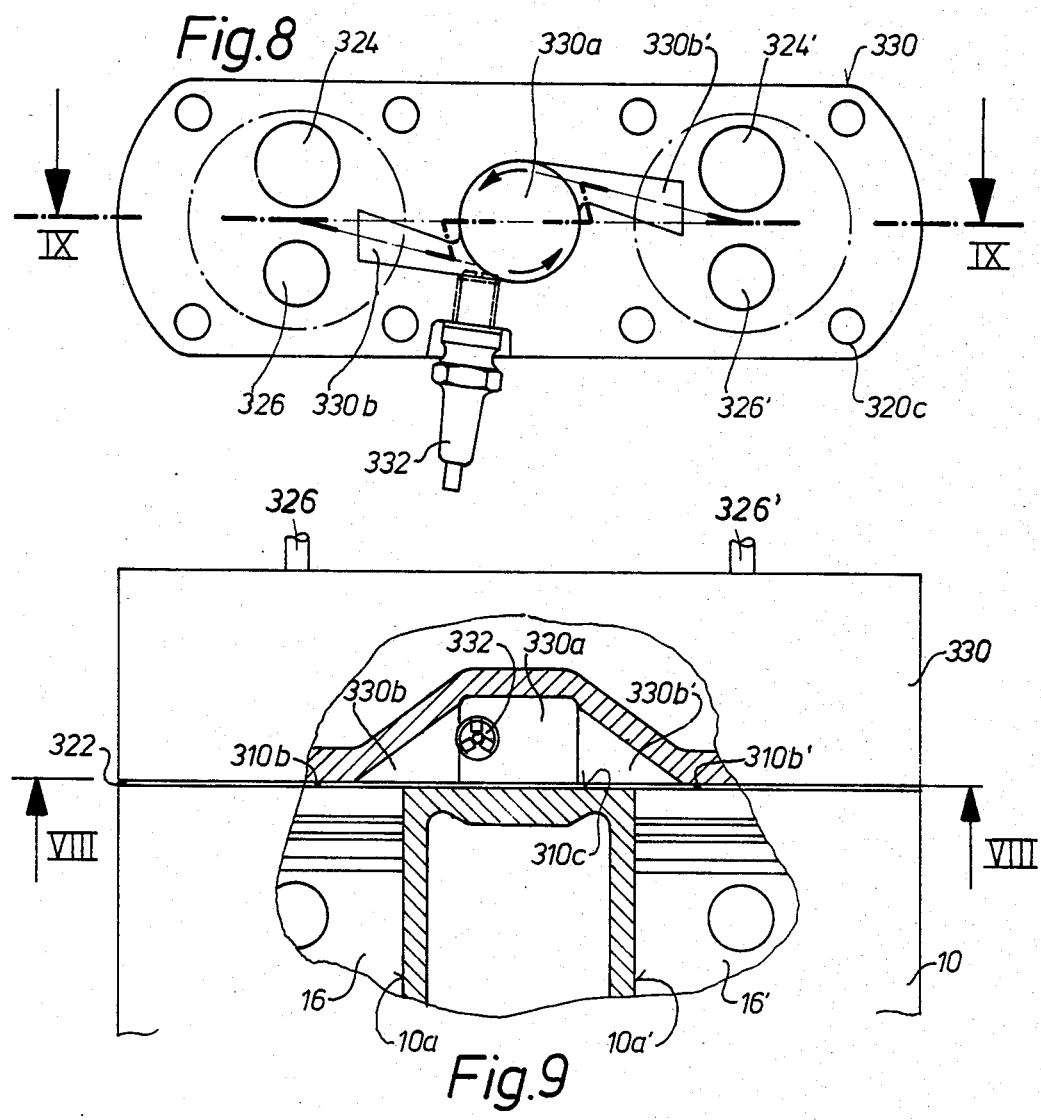

PISTON MACHINE

FIELD OF THE INVENTION

The invention relates to a piston machine and, more particularly, to a piston machine having a number of like working units each comprising a cylinder and a crankshaft mechanism and having a counterweight arrangement for balancing the forces resulting from rotating and oscillating masses of the machine elements.

BACKGROUND OF THE INVENTION

In the case of piston machines, particularly internal combustion engines equipped with stroke pistons, counterweight arrangements have previously been used for balancing the free inertial and centrifugal forces of the first and second order. Furthermore, arrangements are known which produce at least a partial balance of lateral piston forces for the purpose of eliminating torques around the crankshaft axes. Such torques, which are periodically generated during the operating phases of an engine and cause heavy vibrations, lead to considerable vibrations of the whole body of the engine on its base and from this there are notorious drawbacks such as shaking, formations of cracks, disturbing noises, and the like.

The object of the present invention is to eliminate these disadvantages of known constructions and to provide a balancing arrangement by means of which not only mass forces of the first and second order are completely eliminated, but also damaging effects resulting from lateral piston forces are eliminated.

SUMMARY OF THE INVENTION

This object is met in the present invention by arranging the working units in pairs in a mirror-image fashion relative to a plane of symmetry which extends parallel to the axes of the crankshafts, the crankshafts being driven synchronously with one another but in opposite directions. Each working unit is associated with at least one counterweight mounted on the crankshaft and with at least one balance shaft equipped with balance weights and driven by and disposed parallel to the crankshaft. The respective counter and balance weights of a given pair of working units have equal masses and are arranged in mirror-image fashion relative to the plane of symmetry.

With this arrangement, the free mass forces of each working unit produced during operation of the machine are balanced out by the weights. The side effects produced on the pistons of a pair during the strokes thereof are, as a consequence of the synchronous operation, always directed in opposite directions so that their effects always mutually balance. Piston stroke engines built in accordance with the invention consequently are typified by completely balanced, vibration-free and noiseless operation.

In accord with a further feature of the invention, it is advantageous in order to achieve and maintain the synchronous running, to provide an operational coupling between the working units of at least one pair. A coupling of this nature can be effected by having the pinions of a working unit pair which transmit power to the balance shafts operationally engage each other. For this purpose, the balance shafts are preferably disposed approximately beneath the crankshafts and are rotationally driven at twice the speed of the crankshafts.

Piston stroke engines are frequently used as internal combustion engines or compressors. In all such instances where freedom from vibration and noise during operation is desired, in accord with a further feature of the invention the additional requisite structural elements can also be arranged in mirror-image fashion relative to the plane of symmetry so that there will be no detrimental effects transmitted from these constructional elements to the exterior of the engine.

Where use is made of at least partially-balanced internal combustion engines for driving further machines, for example compressors, the disadvantage frequently occurs that vibrations or shaking from the driven machine are transmitted through the coupling members to the driving internal combustion engine, and thus negate the balancing. To avoid this defect, in accord with a further feature of the invention it is proposed to make an assembly of an internal combustion engine and a compressor in such a way that each crankshaft of the internal combustion engine drives a corresponding crankshaft of the compressor and each balance shaft of the internal combustion engine drives a balance shaft of the compressor.

Compressors are frequently used for media, for example gases, which should not be allowed to make contact with other media used or generated in the internal combustion engine, for example in view of the potential production of toxic gases. Moreover, it may be desirable to prevent quantities of gas eddying in the crankshaft area of the compressor from being enriched by leakage quantities of the lubricating oil used for the balance shafts, which leakages might reach the media to be compressed by the compressor and cause undesirable contamination. Therefore, a further useful feature of the invention is to mount the balance shafts of the compressor in a separate sealed chamber. This chamber can be a component of the compressor, or can be a separate component secured to the housing of the internal combustion engine in such a way that it projects freely into the region of the compressor housing and is disposed approximately beneath the crankshafts of the latter. The assembly (internal combustion engine plus compressor) which is made in accord with the present invention and is fully balanced is particularly useful in heat pumps for household heating purposes, which are frequently installed in domestic cellars. A fully balanced heat pump assembly will not produce any kind of shaking, vibrations or the like which could have a detrimental effect on the foundation or the environment of the building, with the result that there will be a smooth and noiseless operation of the domestic heating system.

During starting of an internal combustion engine, combustion is at first not uniform, and there consequently is variation in the cylinder pressures and interruptions occur which produce undesirable vibrations around the axis of the crankshaft.

These vibrations can lead to damage of the bearings, conduits, regulating appliances and also to acoustic effects, particularly in the case of machines which are started up very frequently, for example machines driving heat pumps which are operated under a time program.

In the case of the use of piston stroke machines as internal combustion engines, as mentioned above, the drawbacks recited can be avoided according to the invention by providing a common eddy chamber for the combustion chambers of two cooperating working units. This ensures that, during compression and combustion, the same pressure prevails in both combustion chambers and also ensures that, on the cessation of firing, no free forces will be generated which would interfere with the smooth running of the engine.

The common eddy chamber can be arranged centrally between two working units. It may be formed as a discshaped eddy chamber. From each combustion chamber of the working units a connecting channel of generally rectangular cross section, continuously tapering in cross section, opens tangentially into the eddy chamber. By this, the combustion air entering the eddy chamber is set into rotation during the compression stroke.

If the machine described is a Diesel motor, a multi-orifice injection nozzle is arranged centrally in the eddy chamber and this produces, by the fuel jets thereof, a fine fuel-air mixture in the rotating volume of combustion air.

Where the machine described is an Otto engine, a spark plug is arranged in the vicinity of the inlet of a connecting duct into the eddy chamber, where more favorable conditions for initiating the combustion exist than in the center of the chamber.

BRIEF DESCRIPTION OF THE DRAWINGS

Several embodiments of the invention are described below with reference to the drawings. In the drawings:

FIG. 6 is a sectional view taken along the line VI—VI in FIG. 7 of a further internal combustion engine, embodying the invention, and illustrates the underside of the cylinder head;

FIG. 7 is a sectional view taken along the line VII—VII in FIG. 6;

FIG. 8 is a sectional view similar to FIG. 6 and taken along the line VIII—VIII in FIG. 9 of an Otto engine; and FIG. 9 is a sectional view taken along the line IX—IX of FIG. 8.

DETAILED DESCRIPTION

Figure 1:
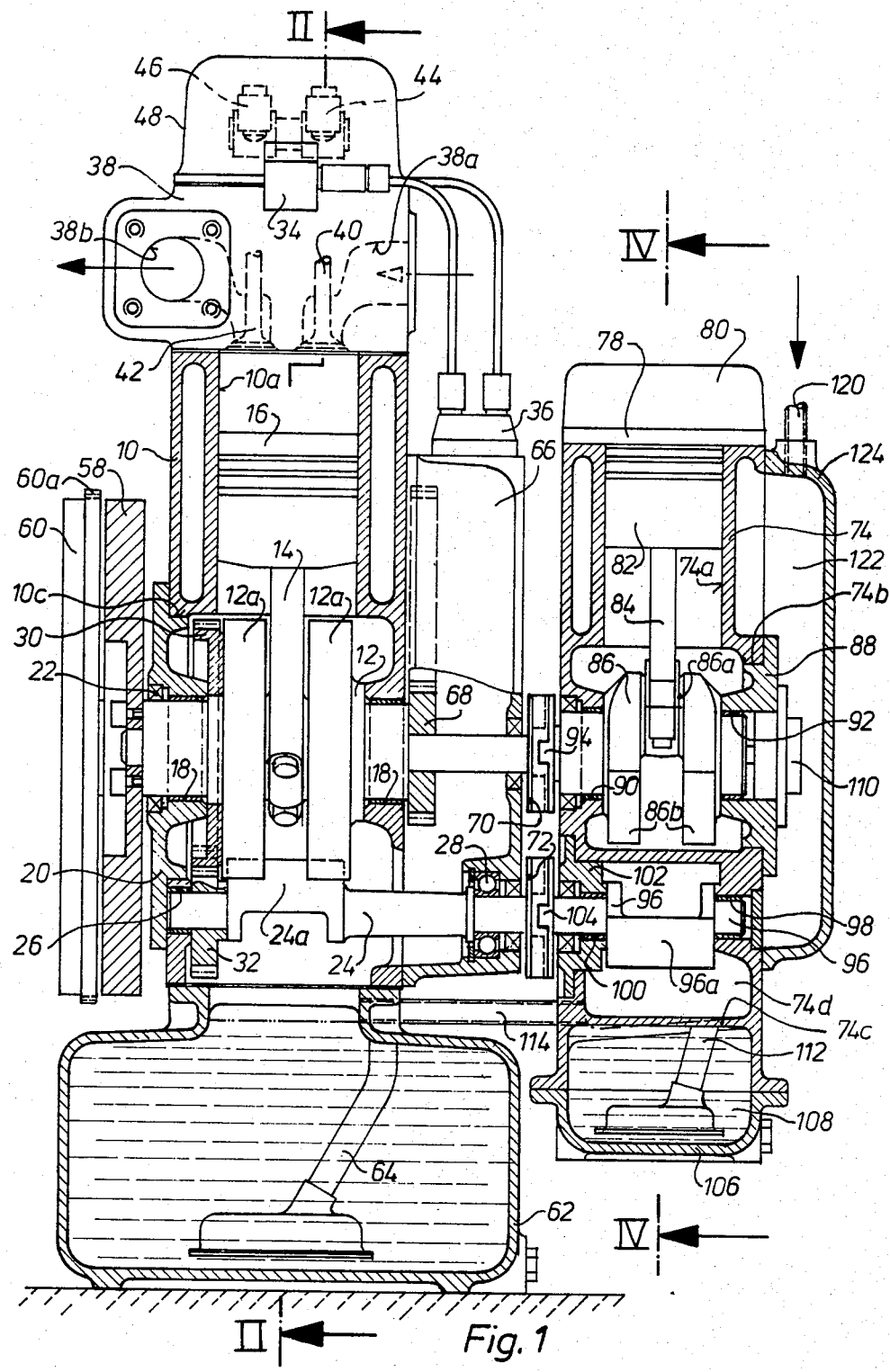
FIG. 1 is a longitudinal sectional view taken along the line I—I of FIG. 2, illustrating an internal combustion engine and a compressor embodying the invention.
Figure 2:
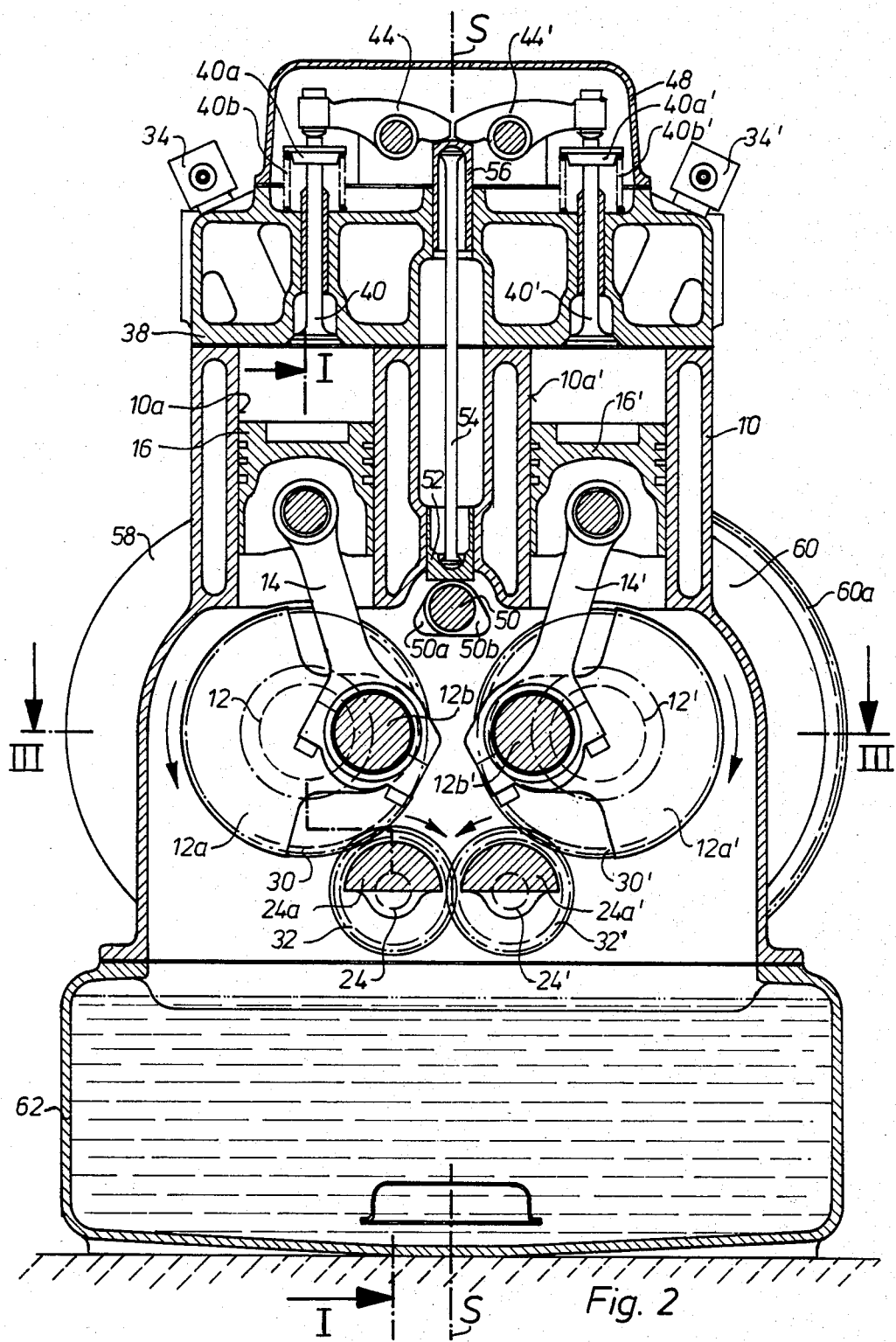
FIG. 2 is a sectional view of the engine taken along the line II—II of FIG. 1.

The embodiment illustrated in FIGS. 1 to 4 comprises an internal combustion engine and a compressor, preferably a compressor intended for use in a heat pump. Two similar working units of the driving engine are arranged in a common machine housing in mirror-image fashion about a vertical plane of symmetry S (FIG. 2). The compressor also includes two similar working units which are also arranged in mirror-image fashion about the plane S. The corresponding structural elements of the corresponding working units are for this reason designated with the same reference numerals distinguished by a prime (').

Rotationally supported in an engine housing 10 (FIG. 1) is a crankshaft 12 having a crank pin 12b and a connecting rod 14 is operationally engaged with the crank pin 12b. The piston 16 associated with the rod 14 is slidably received in a combustion cylinder 10a in the housing 10. The two main bearings of the crankshaft 12 are slide bearings designated by reference numerals 18. Secured across a lateral opening 10c of the housing 10 is an end plate 20 which carries a shaft sealing ring 22. The opening 10c is large enough to admit the crankshaft 12 into the housing 10 during assembly. The crankshaft 12 has two counterweights 12a thereon. Approximately beneath and generally parallel to the crankshaft 12 is a balance shaft 24 rotationally supported in the housing 10 and carrying a balance weight 24a. The shaft 24 is rotationally supported by a slide bearing 26 and a ball bearing 28 and is driven by the crankshaft 12 at double the speed thereof but in the opposite rotational direction. This drive is implemented by engagement of a gear 30 on the crankshaft 12 with a gear 32 on the balance shaft 24. As shown in FIG. 2, the gears 32 and 32' on the balance shafts 24 and 24' also engage each other, thereby synchronizing movement of the crankshafts 12 and 12' and the pistons 16 and 16'.

Figure 3:
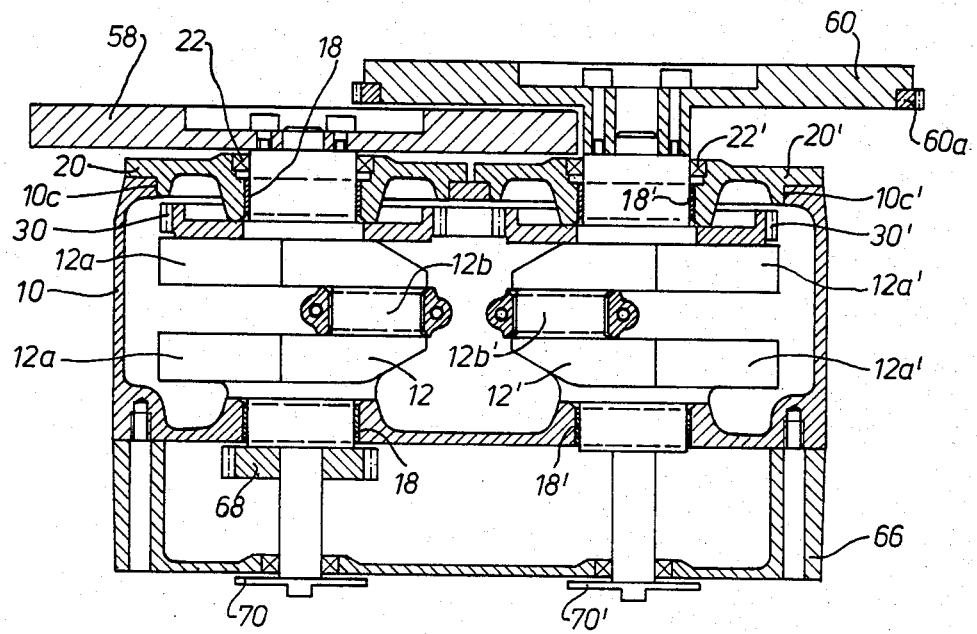
FIG. 3 is a sectional view of the engine along the line III—III of FIG. 2.

The internal combustion engine has further driving elements which may conveniently be disposed in mirror-image fashion in relation to the plane of symmetry S. These elements include a fuel injection nozzle 34 supplied with fuel by an injection pump 36 and mounted in a cylinder head 38 common to the two working units. An intake or inlet valve 40 and an exhaust or discharge valve 42 (FIG. 1) operate against the action of closure springs which bear against spring plates under the control of respective rocker levers 44 and 46 (FIGS. 1 and 2) which are enclosed by a cover 48. For example, referring to FIG. 2, inlet valve 40 is operated against the urging of closure spring 40b on spring plate 40a by a rocker lever 44. A common camshaft 50 has two cams 50a and 50b thereon which operate the rocker levers 46 and 44. The cam 50b drives tappet elements 52, 54 and 56 which operate the rocker lever 44, and the cam 50a drives similar tappet elements which operate the rocker lever 46, but these are not visible in FIG. 2 because they are disposed behind the elements 52, 54 and 56. The combustion air enters the inlet valve 40 through an inlet duct 38a, while the exhaust gases leave the cylinder head 38 through a discharge valve 42 and a discharge opening 38b. A flywheel 58 is secured to one end of the crankshaft 12. A flywheel 60 is secured to an end of the other crankshaft 12' so as to partially overlap the flywheel 58, as shown in FIG. 3. Arranged around the periphery of flywheel 60 are teeth 60a which can be engaged for purposes of starting the engine by a pinion of a conventional and not illustrated electric starter motor. The open lower end of the housing 10 is closed off by a supply reservoir 62 which carries a large quantity (a year's supply) of lubricating oil. A suction duct 64 (FIG. 1) leads from the reservoir 62 to a conventional and not illustrated gear pump disposed in a lateral cover 66 on the housing 10. This pump can, for example, be driven by a toothed wheel 68 mounted on the crankshaft 12. The lubricating oil is distributed through the engine by this pump in a conventional and not illustrated manner.

The end of the crankshaft 12 remote from that carrying the flywheel 58 projects out through the cover 66 and carries a clutch plate 70. The end of the balance shaft 24 also projects outwardly through the cover 66 and carries a similar clutch plate 72. The reservoir 62 is anchored to a support surface and supports the entire structure of the internal combustion engine.

Arranged beside the internal combustion engine is a compressor equipped with two working units, the housing of this compressor being designated by reference numeral 74. The housing 74 of the compressor is connected in a properly oriented fashion to and is carried by the housing 10 of the engine by means of four screws 76 (FIG. 4) which extend through openings in flanges 74a on the compressor housing 74 and threadedly engage openings in the machine housing 10 with the interposition of spacer sleeves (not shown) which surround the screws 76.

Figure 4:
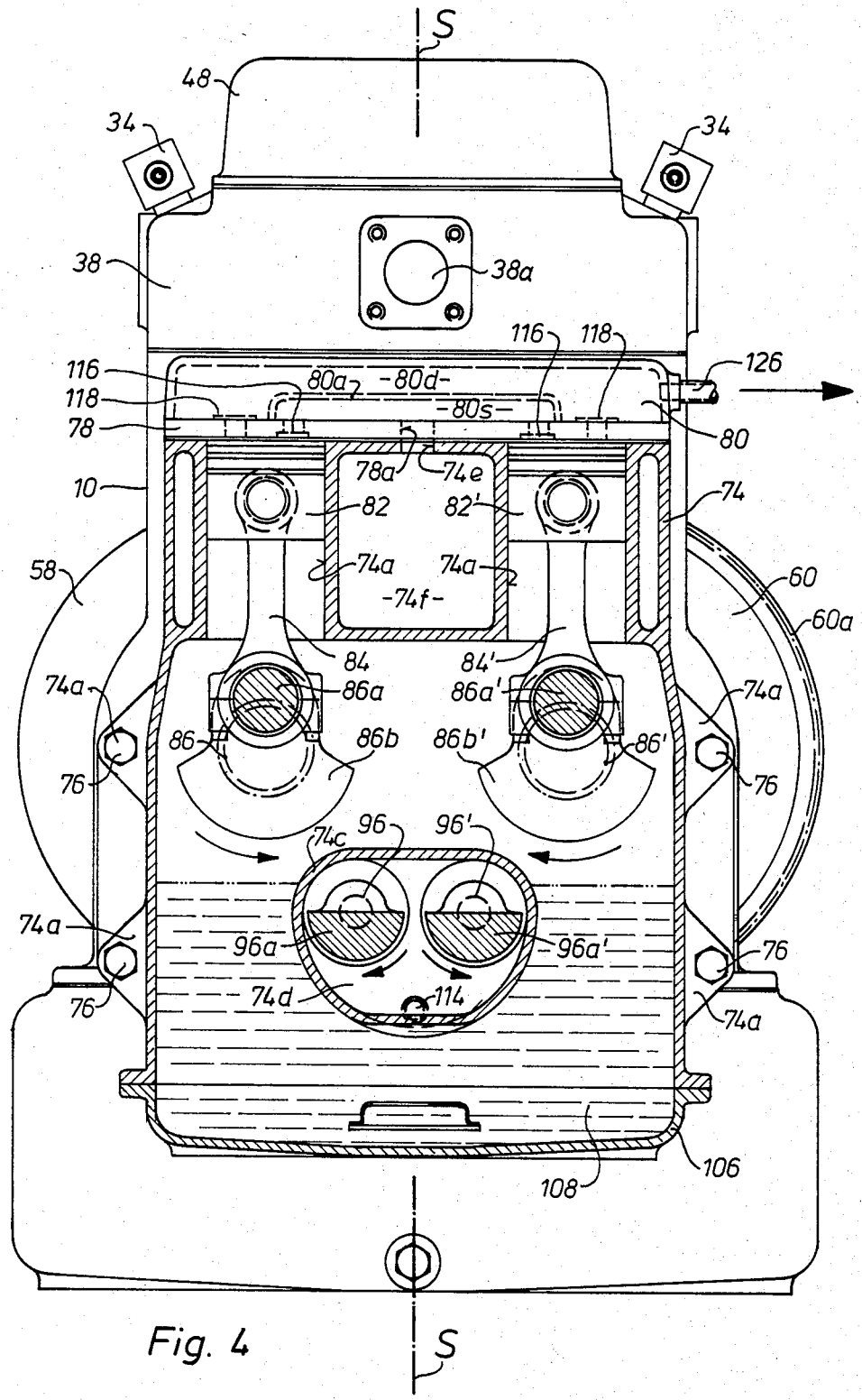
FIG. 4 is a sectional view of the compressor taken along the line IV—IV of FIG. 1.

As shown in FIG. 4, the compressor housing 74 is closed at the top by a valve plate 78 and a cover 80. A piston 82 is coupled to a connecting rod 84 and is slidably arranged in a cylinder 74a in the housing 74.

The connecting rod 84 is connected to a crank pin 86a of a crankshaft 86 (FIG. 1) which is introduced into the housing 74 during assembly through an opening 74b which is then closed with a bearing cover 88. The crankshaft 86 rotates in slide bearings 90 and 92 and carries at its end adjacent the internal combustion engine a clutch plate 94 which engages the clutch plate 70 of the engine crankshaft 12 with the interposition of a conventional universal joint plate, thereby driving the compressor. Counterweights 86b are provided on the crankshaft 86.

Arranged approximately beneath the crankshaft 86 is a balance shaft 96 which carries a balance weight 96a. This shaft runs in slide bearings 98 and 100 which are respectively supported by housing 74 and by a cover 102. At its end facing the internal combustion engine, the balance shaft 96 carries a clutch plate 104 which engages the clutch plate 72 on the balance shaft 74 of the internal combustion engine with the interposition of a conventional universal joint plate.

The open lower end of the compressor housing 74 is closed by a cover 106. A partition 74c (FIG. 1) separates a chamber 74d which contains the balance shafts 96 and 96' from the chamber 108 which serves as the lubricating oil container and can accommodate a large quantity of oil (enough for a year).

A feed pump 110 (FIG. 1) is provided in the mounting cover 88, is directly driven by the shaft 86, sucks the lubricating oil from the container 108 into a conduit 112, and supplies this oil in a conventional manner through feed ducts (not shown) to the individual lubricating points in the compressor. The supply of lubricating oil to the bearing points of the balance shafts located in the chamber 74d is implemented by passageways (not shown) from the lubricating circuit of the internal combustion engine. Surplus oil accumulating in the closed area 74d is returned through a conduit 114 to the reservoir 62 of the engine. The lubricating oil circuit for the balance shafts 96 and 96' is thus separate from the lubricating oil circuit for the crankshafts 86 and 86'. This prevents the lubricating oil circuit for the crankshaft of the compressor, which could due to leakage become mixed with quantities of the medium being compressed, from passing to the lubricating oil circuit of the balance shafts 96 and 96' and finally into the internal combustion engine. Moreover, it also prevents gas which may be stirred up in the crankshaft part of the compressor from being enriched by leakage quantities from the lubricating oil for the balance shafts, which quantities might pass into the medium to be compressed and cause undesirable contamination.

Provided in the valve plate 78 of the compressor are the valves for the two working units of the compressor, and these may for example be flap valves of known form. Each inlet valve is designated 116 (FIG. 4) and each discharge valve 118. The medium to be compressed, for example a coolant gas for a heat pump, is introduced through a feed conduit 120 (FIG. 1) into a chamber 122 formed by the housing 74 and a cover 124. This chamber opens into a further space 74f (FIG. 4) between the cylinders 74a and 74a' which in turn communicates through passages 74e and 78a with a suction chamber 80s in the cover 80. A partition 80a in the cover 80 separates the suction space 80s from the compression space 80d which accepts the compressed gas from cylinders 74a and 74a' and supplies it to a discharge conduit 126.

To set the assembly into operation, the flywheel 60 is put into rotation by means of the not illustrated starter. Since the two working units of the internal combustion engine are coupled by the engagement of the gears 32 and 32', both working units are simultaneously set into motion. The parts thereof now run synchronously so that they for example both reach their upper dead center position at the same moment. The crankshafts 12 and 12', of course, move in opposite rotational directions.

Because of the coupling 70 and 94 and the coupling 72 and 104 between the working units of the internal combustion engine and the compressor, the two working units of the compressor come into action simultaneously and their crankshafts 86 and 86' and balance shafts 96 and 96' turn in opposite directions. The internal combustion engine works on the four-stroke principle and, as a consequence, during one working cycle of the internal combustion engine the compressor will perform two working cycles.

At this point, it should be noted from FIGS. 1, 2 and 4 that the crankshafts 12 and 12' of the internal combustion engine are arranged relative to the crankshafts of the compressor so that the crankpins 12b and 12b' of the crankshafts 12 and 12' are respectively offset by angles of about 90° relative to the crankpins 86a and 86a' of the shafts 86 and 86'. By this, the peaks of a common torque diagram for the internal combustion engine can be reduced.

During operation of the internal combustion engine, forces of the first order resulting from the rotating or oscillating masses are fully compensated for in the vertical direction by the counterweights 12a and 12a' on the respective shafts 12 and 12'. Although a surplus of force in the horizontal direction is also set up during each crankshaft rotation, this surplus is eliminated by the corresponding surplus forces acting in the opposite direction and produced by the opposed working unit, so that no free forces are provided outside the system.

In other words, the vertical components of the first order forces produced by movement of piston 16, connecting rod 14 and crankpin 12b are exactly compensated for by the first order vertical force components produced by the counterweights 12a. Movement of the piston 16, connecting rod 14, crankpin 12b and counterweights 12a also produce certain first order horizontal force components, and these are exactly countered by the corresponding horizontal force components simultaneously produced in opposite directions by the piston 16', connecting rod 14', crankpin 12b' and counterweights 12a'.

The balance weights 24a and 24a' on the balance shafts 24 and 24' are dimensioned so that mass forces of the second order which are generated by other moving engine elements during engine operation and act in the direction of the cylinder axes are fully balanced in the vertical direction. Because of the opposed arrangement of the working units, the surplus forces cancel each other in the horizontal direction. By virtue of the opposite rotational movements and the mirror-image arrangement of the two crankshafts 12 and 12' relative to the symmetry plane S, the variable side forces which in the internal combustion engine are exerted by the pistons 16 and 16' on the associated cylinders 10a and 10a' during compression and combustion are always in opposition to one another. The side forces in one working unit are thus completely eliminated by the opposed side forces in the other working unit. Such forces can therefore produce no torque around the crankshaft axes.

For the sake of good order, it should also be pointed out that the imaginary symmetry plane S extends parallel to and between the two crankshafts 12 and 12' and contains the axes of the control elements 50, 52, 54 and 56, as can best be seen from FIG. 2.

The operating elements of the internal combustion engine, for example the valves and their driving elements, are likewise arranged in mirror-image fashion in relation to the plane of symmetry. The mass forces which may be generated by these operating elements in the horizontal direction also mutually cancel one another. Beyond this, those masses which are effective on one side of the rocker lever pivot pins (elements 52, 54, and 56) may be so dimensioned relative to the masses acting on the other side (elements 40, 40a and 40b) that the mass forces effective in the vertical direction mutually cancel one another out.

When the compressor is coupled to the engine, the forces of the first and second order generated by moving components and by the counterweights 86b and 86b' and the balance weights 96a and 96a' fully cancel one another in a fashion similar to the situation in the internal combustion engine. What has been said above relative to the balancing in the internal combustion engine applies analogously to the balancing of the horizontal forces in the compressor, thus rendering any further explanations in connection with balancing of forces in the latter unnecessary.

In summary therefore, a fully balanced operation in relation to vertical and horizontal forces of the first and second order is achieved in the inventive engine-compressor assembly. This is particularly important when using the assembly in a heat pump, so that vibrations are not produced in the connecting conduits between the compressor and the heat pump and no damage occurs even after lengthy use. Consequently, a smooth operation, necessitating no maintenance over a long period, is ensured.

A more compact construction of the internal combustion engine is achieved by locating the working units closer to the plane of symmetry S. To this end, the heads of the connecting rods 14 and 14' linked to the crankshaft are inclined in disposition and the flywheels 58, 60 partly overlap.

In the present case, the same forces are produced by the two crankshafts 12 and 12'. As a consequence, the gears 30 and 32 are not subject to any disturbing torque which might be generated during a cycle of the internal combustion engine. These wheels only transmit the torque for the balance shafts 24 and 24' and can balance out any torque differences which might occur between the two working units because of different frictional effects.

Figure 5:
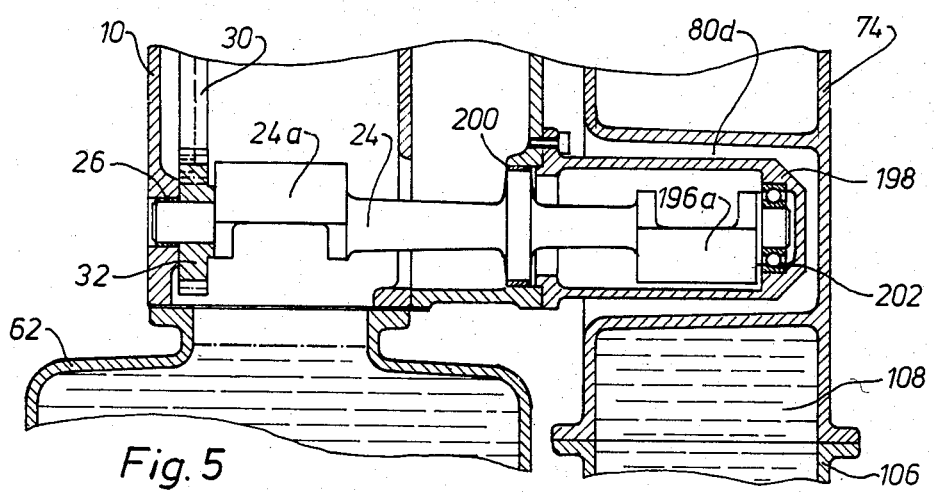
FIG. 5 is a sectional view similar to a portion of FIG. 1 and illustrating a modified embodiment.

FIG. 5 illustrates a different arrangement of the balance weights for the compressor. Here the balance shaft 24 of the internal combustion engine is axially extended and is provided with an additional balance weight 196a, and thus is an operational element of the associated compressor-working unit. The weight 196a projects into a housing 198 screwed to the housing 10 of the internal combustion engine. Slide bearings 26 and 200 supported by the housing 10 and a ball bearing 202 supported by the housing 198 serve to rotationally support the shaft 24. The balance weight 196a is located approximately beneath the associated crankshaft 86 of the compressor. This construction facilitates lubrication of the bearing points associated with the weight 196a by the lubrication system of the internal combustion engine. Moreover, in this case, sealing of the area around the weight 196a, that is to say the capsule 198, relative to the interior of the compressor is not necessary.

FIGS. 6 to 9 show two further embodiments which illustrate the arrangement of an eddy chamber in instances in which the stroke piston engine is a combustion engine, that is to say an injection engine or an Otto engine with external ignition.

In the engine of FIGS. 6 and 7, the cylinder head 320 is disposed above the two working units in the engine housing 10 and is screwed to this housing 10 with an interpositioned seal 322. The fastening screws (not shown) pass through bores 320c therein. The inlet valves 324 and 324' and the discharge valves 326 and 326' are mounted in the usual way in the cylinder head 320 and are operated through rocker levers and tappet rods generally similar to those illustrated in FIG. 2. An eddy chamber 320a is located between the cylinders and is bisected by the symmetrical plane S. It is in the form of a disc-shaped eddy chamber, and the complete capacity thereof is provided in the cylinder head 320. The eddy chamber 320a is connected to the combustion chambers 310b and 310b' by ducts 320b and 320b'. This is to ensure that equal pressure will be present in both combustion chambers under all operating conditions.

The ducts 320b and 320b' open tangentially into the eddy chamber 320a and set the combustion air flowing into the eddy chamber during a compression stroke into rotation. This is a prerequisite for good mixing.

The eddy chamber and the connecting ducts open downwardly, that is to say toward the pistons 16 and 16', whereby they can be manufactured inexpensively and with great accuracy. The lower wall of the eddy chamber and the connection ducts is defined by the flat surface 310c on the housing 10. Fuel is supplied through a nozzle holder 328 and a multi-aperture nozzle 328a. This is mounted centrally in the eddy chamber 320a. The fuel flow is designated by the broken lines at 328b.

FIGS. 8 and 9 show an embodiment of an internal combustion engine with foreign or external ignition, for example an Otto engine. An eddy chamber 330a with connection ducts 330b and 330b' is located in the cylinder head 330. The eddy chamber and the connection ducts differ from that in a Diesel motor primarily in the volumetric size thereof, because the Otto engine has to be operated with a lower compression ratio. The end of a spark plug 332 is located in the eddy chamber 330a in the vicinity of the mouth of a connecting duct, because conditions favoring the initiation of the ignition occur at this location.

In the case of Diesel engines (injection combustion engines), further constructions of a combustion chamber common to two cylinders are feasible, for example two upright eddy chambers of known construction can be located on the axis of symmetry S, and communicate with one another through an aperture, or two antichambers may be provided which are inclined to one another at an acute angle and communicate with each other through an aperture. In both cases, the fuel injection could take place through a single two aperture injection nozzle.

The common eddy chambers according to FIGS. 6 to 9 are equally suitable for Diesel and Otto engines, require no additional constructional parts and facilitate operation for long periods without breakdown.

Finally, it is to be pointed out that the invention is not limited to the embodiments thereof which have been described above. Further, a large number of working units (for example four or six) can be used both in the case of the internal combustion engine and/or the compressor in an analogous symmetrical arrangement where, for example, a more powerful engine operation or a compressor of larger volume is required. Also, working units arranged in accordance with the invention can be used for other purposes.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a piston machine assembly which includes at least one piston machine having:
   two similar, rotatably supported, parallel crankshafts which are each operatively coupled to a respective piston, said crankshafts being driven synchronously with one another, and said pistons and crankshafts forming a working unit;
   two rotatably supported balance shafts which are each associated with an extend approximately parallel to a respective said crankshaft;
   counterweights of equal mass supported on said crankshafts and balance weights of equal mass supported on said balance shafts, said crankshafts, said pistons, said balance shafts, said counterweights and said balance weights being arranged in mirror-image fashion relative to a plane of symmetry which extends parallel to and is disposed intermediate said crankshafts and said balance shafts; and
   coupling means for operatively rotationally coupling said crankshafts and said balance shafts;
   the improvement comprising wherein:
   said coupling means is adapted to cause said crankshafts to rotate synchronously with one another but in opposite directions; and
   each of said balance shafts is disposed adjacent to and is driven through said coupling means by the associated crankshaft in a rotatable direction which is opposite to that of and at a speed which is twice that of the associated crankshaft, first and second order forces produced by rotating and oscillating elements of said piston machine being fully balanced by forces produced by said counterweights and said balance weights.

2. The piston machine assembly according to claim 1, wherein said piston machine is an internal combustion engine which has further operating elements which are arranged in mirror-image fashion relative to said plane of symmetry.

3. The piston machine assembly according to claim 2, wherein said internal combustion engine has two combustion chambers, each said piston thereof being movably supported in a respective said chamber, and including an eddy chamber which is provided between said chambers, is intersected by said plane of symmetry, and is in fluid communication with each of said combustion chambers by means of a respective connecting duct.

4. The piston machine assembly according to claim 3, wherein said eddy chamber is disc-shaped and said ducts each open tangentially into said eddy chamber.

5. The piston machine assembly according to claim 4, wherein said engine is an external ignition engine and includes a spark plug having electrodes disposed in said eddy chamber in the vicinity of a channel inlet thereof.

6. The piston assembly according to claim 3, wherein said eddy chamber is provided entirely in a cylinder head of said engine, wherein said eddy chamber and said ducts open downwardly from said cylinder head, and wherein an upwardly facing surface of a housing of said engine defines a bottom wall of said eddy chamber and said ducts.

7. The piston machine according to claim 3, wherein said engine is an injection combustion engine and includes an injection nozzle communicating with said eddy chamber centrally thereof.

8. The piston machine assembly according to claim 1, including two said piston machines, one of which is an internal combustion engine and the other of which is a compressor, and wherein each said crankshaft of said internal combustion engine drives a respective said crankshaft of said compressor and each said balance shaft of said internal combustion engine drives a respective said balance shaft of said compressor.

9. The piston machine assembly according to claim 8, wherein said balance shafts of said compressor are disposed in a sealed chamber separate from said crankshafts of said compressor.

10. The piston machine assembly according to claim 9, wherein said chamber for said balance shafts of said compressor is part of a housing of said compressor.

11. The piston machine assembly according to claim 10, wherein said piston machine assembly which is fully balanced as to mass forces is adapted to be part of a heat pump used for heating purposes.

12. The piston machine assembly according to claim 8, wherein said crankshafts of said internal combustion engine are angularly oriented relative to the associated crankshaft of said compressor so that a crankpin of each said crankshaft of said internal combustion engine is angularly offset by 90° relative to a crankpin of the associated crankshaft of the compressor.

13. The piston machine assembly according to claim 9, wherein said chamber for said balance shafts of said compressor is a unit which is secured to a housing of said internal combustion engine and projects into a housing of said compressor so as to be disposed beneath said crankshafts of said compressor.

14. The piston machine assembly according to claim 1, wherein said coupling means includes four gears, each of said crankshafts and each of said balance shafts being operatively connected to a respective one of said four gears of said gear coupling means, a first said gear which is operatively connected to one of said crankshafts being in meshing engagement with a second said gear which is operatively connected to one of said balance shafts, a third said gear which is operatively connected to the other of said crankshafts being in meshing engagement with a fourth said gear which is operatively coupled to the other of said balance shafts, and said second and fourth gears being in meshing engagement with each other.

15. The piston machine assembly according to claim 1, wherein said balance shafts are each located approximately beneath the associated crankshaft.

16. The piston machine assembly according to claim 1, wherein said piston machine is a compressor which has further operating elements which are arranged in mirror-image fashion relative to said plane of symmetry.

17. A piston machine, comprising a plurality of similar working units which each include a cylinder, a crankshaft, and a counterweight arrangement for balancing the forces resulting from rotating and oscillating masses of the machine elements; wherein the working units are arranged in pairs in mirror-image fashion relative to a plane of symmetry which extends parallel to the axes of the crankshafts and are driven so that the crankshafts of each said pair turn synchronously with one another but in opposite directions, and wherein each of the working units includes at least one counterweight supported on the associated crankshaft and at least one rotatably supported balance shaft which has a balance weight thereon and is driven by and disposed parallel to the crankshaft, the counterweights and balance weights of each said pair of the working units having equal respective masses and being arranged in mirror-image fashion relative to the plane of symmetry; wherein the piston machine is an internal combustion engine having further operating elements which are also arranged in mirror-image fashion relative to the plane of symmetry; wherein the piston machine further includes a compressor having operating elements which are arranged in mirror-image fashion relative to the plane of symmetry; and wherein the internal combustion engine and the compressor constitute an assembly in which said crankshaft of the internal combustion engine drives a crankshaft of the compressor and each said balance shaft of the internal combustion engine drives a balance shaft of the compressor.

18. The piston machine according to claim 17, wherein the balance shafts of the compressor are disposed in a separate sealed chamber.

19. The piston machine according to claim 18, wherein the balance shaft chamber is part of the compressor housing.

20. The piston machine according to claim 19, wherein the piston machine which is fully balanced as to mass forces, is part of a heat pump used for heating purposes.

21. The piston machine according to claim 18, wherein the balance shaft chamber is a unit which is secured to the housing of the internal combustion engine and projects into the region of the compressor housing so as to be disposed beneath the crankshafts of the compressor.

* * * * *

UNITED STATES PATENT AND TRADEMARK OFFICE
CERTIFICATE OF CORRECTION

PATENT NO. : 4 509 474
DATED      : April 9, 1985
INVENTOR(S) : Johann SCHMUCK

It is certified that error appears in the above-identified patent and that said Letters Patent is hereby corrected as shown below:

Column 10, line 14; after "piston" insert ---machine---.

Column 12, line 8; after "which" insert ---each---.

Signed and Sealed this

Fifteenth Day of October 1985

[SEAL]

*Attest:*

*Attesting Officer*

DONALD J. QUIGG

*Commissioner of Patents and Trademarks—Designate*